US012719041B2

(12) United States Patent
Javahery et al.

(10) Patent No.: US 12,719,041 B2
(45) Date of Patent: Aug. 25, 2026

(54) SYSTEM FOR PRODUCTION OF HIGH YIELD OF IONS IN RF ONLY CONFINEMENT FIELD FOR USE IN MASS SPECTROMETRY

(71) Applicant: QuadroCore Corp., Markham (CA)

(72) Inventors: Gholamreza Javahery, Thornhill (CA); Victor Titov, Etobicoke (CA); Dmitry Valyaev, Richmond Hill (CA); Fadi Jozif, North York (CA)

(73) Assignee: Quad Mass Corp., Thornhill (CA)

( * ) Notice: Subject to any disclaimer, the term of this patent is extended or adjusted under 35 U.S.C. 154(b) by 383 days.

(21) Appl. No.: 18/550,945

(22) PCT Filed: Mar. 14, 2022

(86) PCT No.: PCT/CA2022/050370
§ 371 (c)(1),
(2) Date: Sep. 15, 2023

(87) PCT Pub. No.: WO2022/192995
PCT Pub. Date: Sep. 22, 2022

(65) Prior Publication Data
US 2024/0162024 A1 May 16, 2024

Related U.S. Application Data

(60) Provisional application No. 63/161,539, filed on Mar. 16, 2021.

(51) Int. Cl.
*H01J 49/06* (2006.01)
*H01J 49/10* (2006.01)
*H01J 49/14* (2006.01)

(52) U.S. Cl.
CPC .......... *H01J 49/063* (2013.01); *H01J 49/102* (2013.01); *H01J 49/145* (2013.01)

(58) Field of Classification Search
CPC ...... H01J 49/102; H01J 49/145; H01J 49/062; H01J 49/063
See application file for complete search history.

(56) References Cited

U.S. PATENT DOCUMENTS

2008/0217528 A1 * 9/2008 Gonin .................... H01J 49/04 250/287
2013/0026360 A1 * 1/2013 Stoermer ............ H01J 49/0072 250/292

* cited by examiner

*Primary Examiner* — David E Smith

(57) ABSTRACT

A combined ion discharge tube and an ion guide system is disclosed. The ion discharge tube comprises of a cathode tube and an anode surface. The discharge tube acts as the cathode, whereas the anode can be any number of different configurations. In one embodiment the discharge tube is set inside a quadrupole ion guide, with the walls of the ion guide being the anode. In other embodiments, the discharge tube is placed inside the rods of the quadrupole and the inner walls of the rods or a separate plate acting as the anode. In all configurations, the ions are formed by the discharge tube and are introduced into the RF confinement of an ion guide to increase ion transfer efficiency.

14 Claims, 16 Drawing Sheets

SYSTEM FOR PRODUCTION OF HIGH YIELD OF IONS IN RF ONLY CONFINEMENT FIELD FOR USE IN MASS SPECTROMETRY

FIELD OF THE INVENTION

The present invention relates generally to an apparatus for and method of an ion source for producing high yield of ions and capturing them in an RF only ion guide.

BACKGROUND OF THE INVENTION

Mass spectrometers (MS) are used to determine a molecular weight and structural information about chemical compounds. Molecules are weighed by ionizing the molecules and measuring the response of their trajectories in a vacuum to electric and magnetic fields. Ions are weighed according to their mass-to-charge (m/z) values. In order to achieve this, a sample that is to be characterized, is ionized and then injected into the mass spectrometer. Sensitivity of a mass spectrometer is, in part, directly depends on efficiency of ion source for generating a high yields of desired ion of interest.

In a plasma discharge ionization source, electron excitation occurs causing formation of negative ions (M−), positive ions (M+), meta-stable neutrals (M*), fast/slow free electron (e−) and visible light (Photons). This method is considered to be a rich environment (ion source) for gas phase production of M− and M+ ions necessary in mass spectrometry (MS) applications. Extraction and transportation ions in high abundant from ion source to mass analyzer reflects in sensitivity and high power of detection in modern mass spectrometry.

Since mass spectrometers generally operate in a vacuum (maintained lower than $10^{-4}$ Torr depending on the mass analyzer type), charged particles generated in in a higher pressure ion sources must be transported into vacuum for mass analysis. Typically, a portion of the ions created in the pressurized sources are entrained in a bath gas and transported into vacuum Doing this efficiently presents numerous challenges.

One method of transferring ions is by using ion-guides. Multipole ion guides have been used to efficiently transfer ions through vacuum or partial vacuum into mass analyzers. In particular, multipole ion guides have been configured to transport ions from a higher pressure region of mass spectrometer to the lower pressure and then vacuum where analyzer is operational.

The use of RF multipole ion guides—including quadrupole ion guides—has been shown to be an effective means of transporting ions through a vacuum system. An RF multipole ion guide is usually configured as a set of (typically 4, 6, or 8) electrically conducting rods spaced symmetrically about a central axis with the axis of each rod parallel to the central axis. Ions enter into the ion guide experience the RF confinement fields and intend to move to the central axis of the ion guide. In ion guides operating in an elevated pressure, ions are susceptible to collide with the background gas and hence, as a result of collision, lose portion of their translational and radial energy. The phenomena known as collisional focusing, makes ions to bundle more effectively to the center line of the ion guide and therefore transported to the exit in high abonnement.

In the present system, the ion source and the ion guide are combined in one system to create a fast release of ions, with increased efficiency of ion transport.

SUMMARY OF THE INVENTION

The present device is a high efficiency ion source operating at a few Torr pressure. Ions generated from the source immediately introduced into or created in an ion guide. The ions are introduced in or around the zero field lines of the RF field, therefore, they will be trapped there and can be transported to the lower pressure region of the mass spectrometer device. The RF only ion guide is also a suitable environment for ion/molecular reactions. There are numerous advantages namely, quenching the energy of the meta-stable molecules by introduction of suitable reagent into the device. Mechanism is known as penning ionization as follow $$A^*+Re \rightarrow Re^{+}+A$$

Ions created as a result of this process can be unstable within the boundary of RF field or easily filtered by the mass analyzer.

Ion guide can act as a reaction cell where ion/molecular reaction occurs for generating ions by soft ionization. Ion chemistry is considered as the softest ionization process in which electron or charge transfer, or any other allowed chemistry can occur between an ion and the analyte partner with minute releases of energy. This energy is not sufficient to cause any structural changes therefore keeping the structure of the molecule ion intact and stable.

It can also be used as a collision cell where ions undergo fragmentation or declustering process, forming more intact ions of interest, by gaining energy as a result of acceleration.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF THE INVENTION

Figure 1:
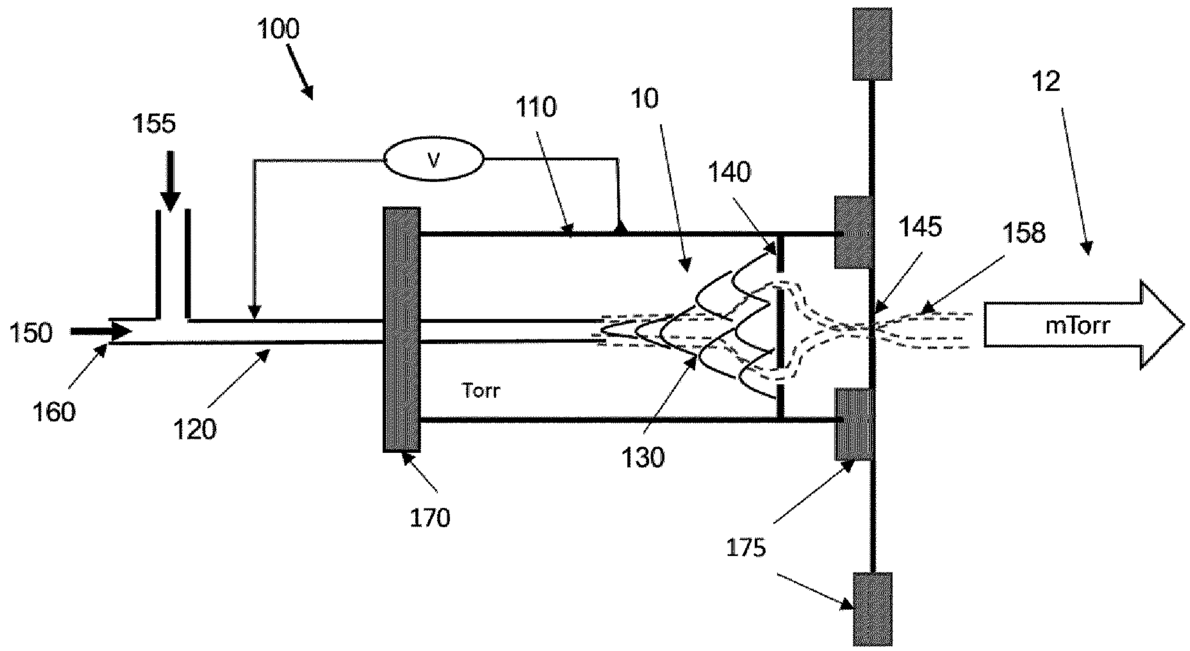
FIG. 1 shows one embodiment of an ion source for the present invention.

FIG. 1 shows one embodiment of the ion source for use in the present invention. In this embodiment a discharged source 100 is used (as the ion source normally sustained at a few Torr pressure. This ion source comprises of an anode tube 110 and a cathode tube 120 to form a discharge within the tube ion source 130. The plasma may comprise of electrons, ions, meta-stable neutrals and photons. Photons, free electrons and neutrals are undesirable species and should not interfere with operation of the mass spectrometer (MS). Only negative and positive ions are of interest. Therefore, a blocker 140 may be provided to remove photons and electrons. A gaseous flow 150 entering from one end 160 of the tube 120 guides the ions towards the ion guide, while the electron blocker 140 prevents flow of other species. This way, ions entrained in the neutral flow are effectively extracted from the discharge tube. Ions 158 are then immediately introduced in the RF confinement field of RF only ion guide through an aperture 145 of appropriate size to sustained ion guide pressure lower than pressure of the ion source (See FIG. 2A). Insulators 170 and 175 insulate the discharge tube from other parts of the system. Ions are transported into the RF confinement field purely by flow from high pressure region 10 to lower pressure 12 on opposite sides of the aperture 145. Within the confinement fields, ions are either trapped or transmitted continuously while collisionally focused under the influence of RF field and collision with the background gas. MS sensitivity is increased significantly as a result.

The RF only ion guide is most suitable environment for quenching the energy of the meta-stable molecules by introduction of suitable reagent into the device. Mechanism is known as penning ionization as follow:

$$A^* + Re \rightarrow Re^{+} + A$$

Ions created as a result of this process can be unstable within the boundary of RF field or easily filtered by the mass analyser. Ion guide can act as a reaction cell where ion/molecular reaction process occurs. This can also be used as a collision cell where ions gain energy by means of axial acceleration, radial excitation, near instability energy gain or micro motion in order to undergo fragmentation or declustering process.

Figure 2A:
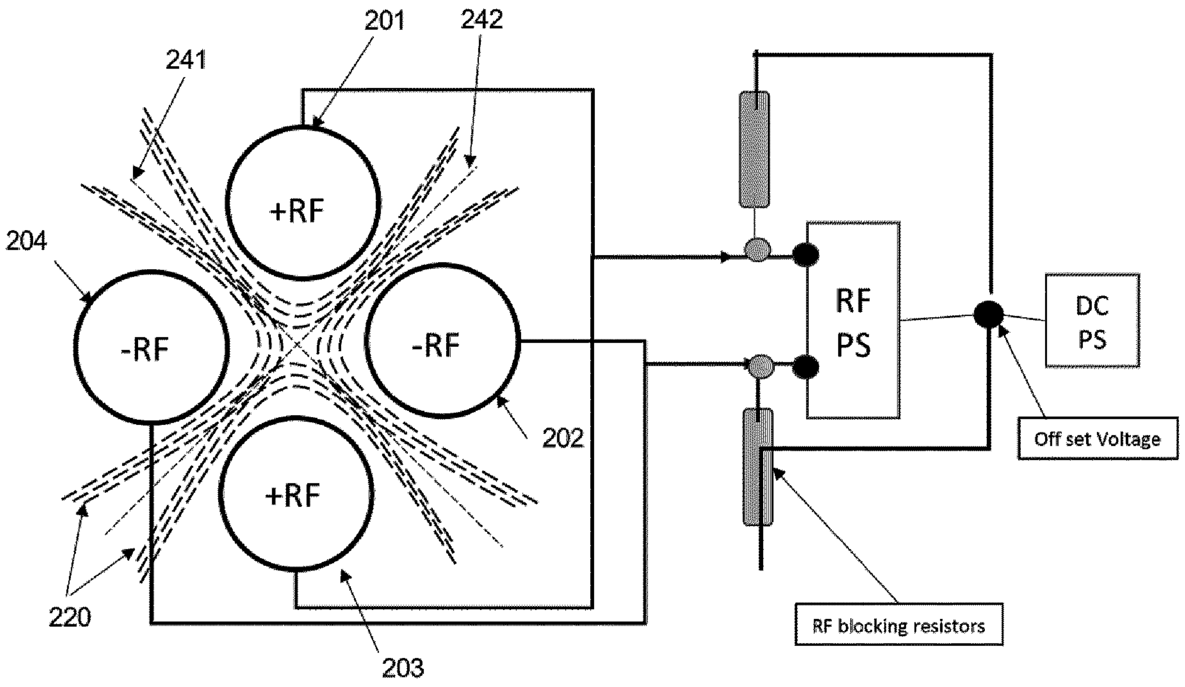
FIG. 2A shows RF fields and the zero field lines of a quadrupole ion guide with circular rods.
Figure 2B:
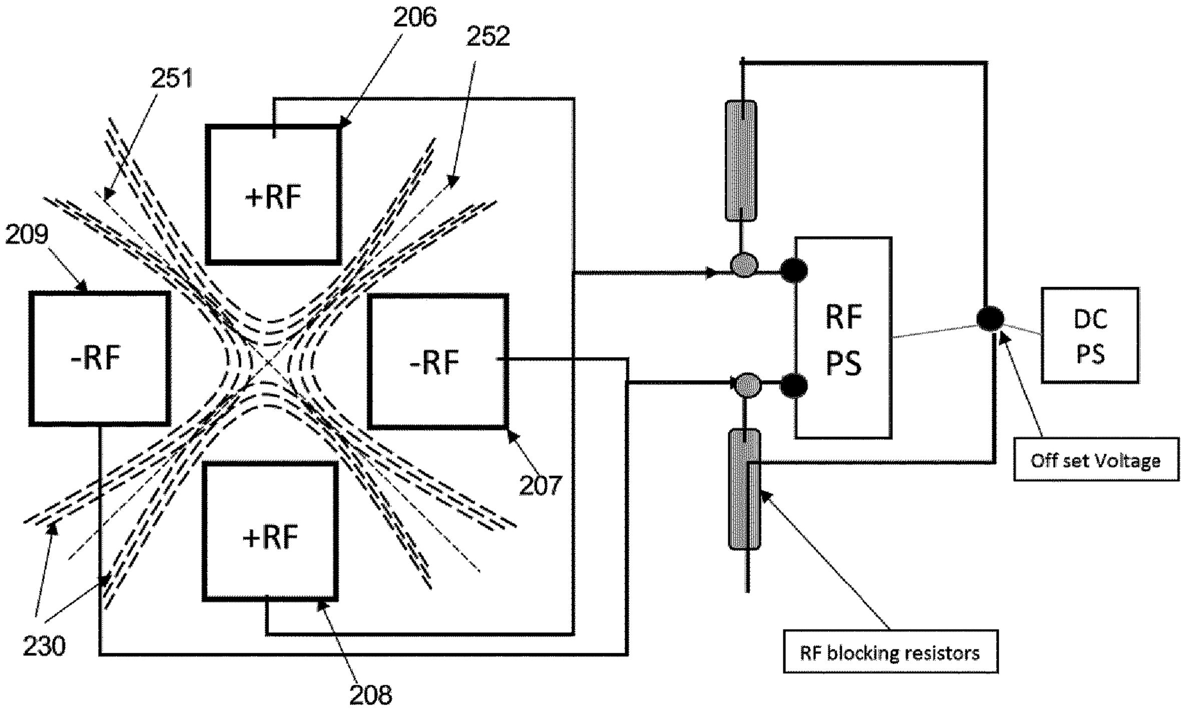
FIG. 2B shows RF fields and the zero field lines of a quadrupole ion guide with square rods.

Examples of RF fields for a quadrupole system are shown in FIGS. 2A and 2B. However, the RF can be generated with other arrangements, such as a Hexapole or a Octupole (or other number of poles). The quadrupole of FIG. 2A consists of four parallel metal rods, 201, 202, 203, 204. Similarly, the quadrupole of FIG. 2B consists of four parallel metal pieces with square cross sections, 206, 207, 208, 209. Each opposing rod pair is connected together electrically. Only ions of a certain mass-to-charge ratio will reach the detector for a given ratio of voltages: other ions have unstable trajectories and will collide with the rods. This permits selection of an ion with a particular m/z or allows the operator to scan for a range of m/z-values by continuously varying the applied voltage. A linear series of quadrupoles can be used. The first (Q1) quadrupole 200 act as mass filters and collision cell using Ar, He, or N2 gas ($-10^{-3}$ Torr, −30 eV) for collision induced dissociation of selected parent ion(s) from QI.

The RF field 220 is generated between the rods. A zero field is referred to the zone at the central axes of the poles. One can define an x and y axis for the cross section of the system and a z axis along the length of the rods. The zero field lines in the cross section are 241 and 242 shown in FIG. 2A and are 251 and 252 in FIG. 2B. In the present invention, the ions are injected right into the zero field lines or as close to them as possible. This traps the ions in the RF field and provides an efficient use of ions and therefore a high sensitivity system.

Figure 3:
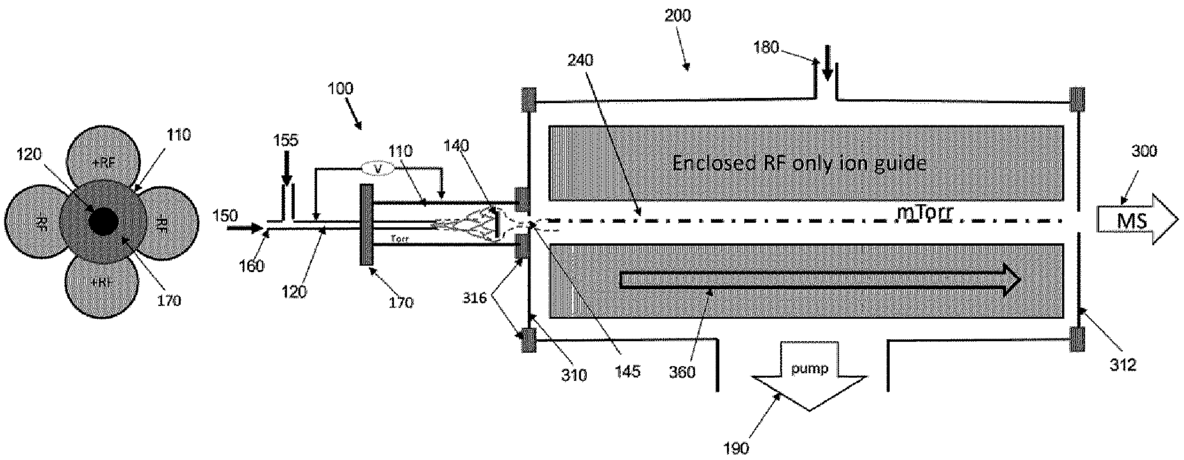
FIG. 3 shows the one embodiment of the present system in which the ion discharge is directly introduced into the central zero field of an ion guide.

FIG. 3 shows one embodiment of the present system in which the ions from the discharge 100 are introduced into the central zero field 240 of an ion guide 200. The ion guide 200 comprises of a multipole ion guide configured with a predefined radial diameters. The ion guide may have an inlet lens 310, exit lens 312 and insulators 316. In the preferred embodiment shown, ions which are transferred from the ion source enter directly into the zero field 240 of the quadrupole ion guide. This provides an effective ion trapping efficiency which fall within the stability window set by the potentials applied to the quadrupole rods.

Discharge tube 100 is sustained at several Torrs of Pressure by introduction of a makeup gas 155 such as Ar, He, N2 and others. Ion guide is pressurized by the leakage from the aperture 145 of the discharge tube 100 and sustained at a few mTorr by the aid of a vacuum pump 190. Analytes can be introduced from inlet-1 160 directly or by other devices such as a GC (Gas Chromatograph), ionizes and then introduce into the ion guide. A quadrupole with four rods equally spaced rods as in FIG. 2A 201, 202, 203, 204 at a predetermined radius around a central axis makes the ion guide. Alternatively, ions created in the discharge tube are introduced into the ion guide and analyte via inlet-2 180. Analyte will be ionized through ion/molecular reaction before introduction into MS 300.

Because ions are injected in the zero electric field line 240, the trajectories of the ions are substantially parallel and collimated inside the MS. Meta-stable neutrals can be quenched by introducing an appropriate reagent through the inlet-2 180. An axial field 360 may be provided to transfer ions from the ion guide to the next stage of the MS device. Entrance voltage can be set so that it pushes ions forward to the exit of the ion guide.

Inlet-2 180 is for allowing any other gases in. For example, to introduce analytes and ionize them in the secondary collisional processes, where ions are transferred from the ionized gases to the inlet gas (e.g., analytes), which is stable, since no energy was applied to them directly.

Figure 4:
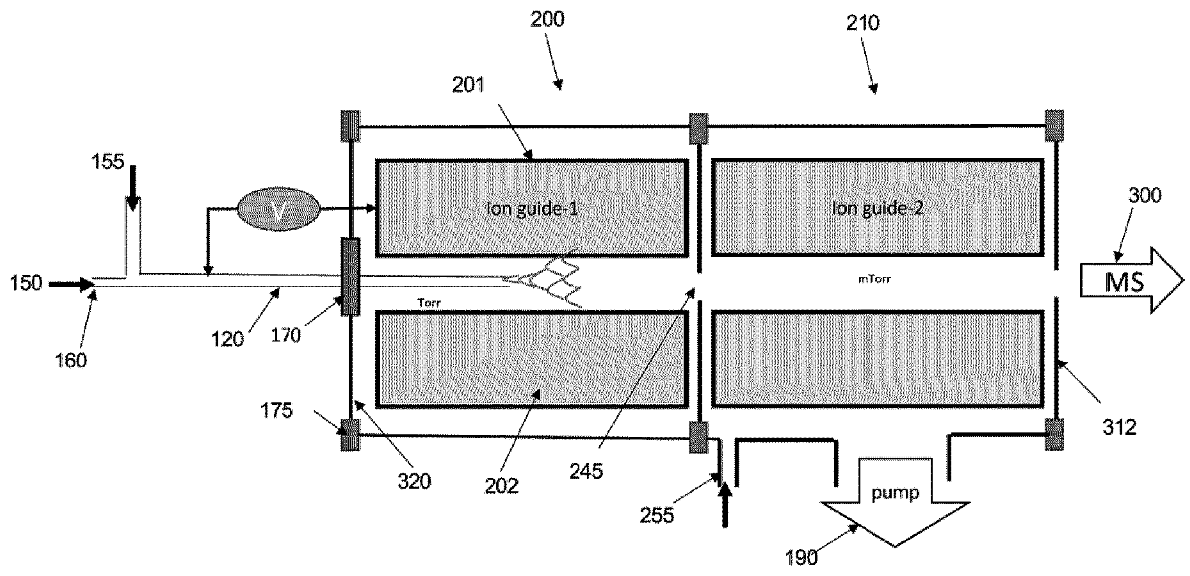
FIG. 4 shows another embodiment of the present invention in which the cathode is inserted directly into the central region of the ion guide.

The second embodiment of the present invention is shown in FIG. 4, in which the cathode tube 120 is inserted directly into center of an ion guide 200. A radio frequency (RF), e.g. a 1 MHz sine wave potential, is applied between the rods. The potential on adjacent rods is 180° out of phase. Rods on opposite sides of the quadrupole axis are electrically connected—i.e. the quadrupole is formed as two pairs of rods. The quadrupole has an entrance end and an exit end.

Ions are introduced in a first ion guide 200 and travel along the axis of the quadrupole to the exit end to enter the second ion guide 210. The first ion guide is at a higher pressure than the other, therefore, there is a flow from the first ion guide to the second ion guide, carrying the ions. The two ion guides of FIG. 4 receive ions at a relatively high pressure, in the first ion guide, and focuses the ions and transmits them to the second ion guide, which is at a relatively low pressure. There may be more number of ion guide stages. The ion guide rods 201, 202 act as anode of the discharge tube 120. Any of the ion guide rods can act as the anode of the ion discharge tube.

The first ion guide 200 is sustained at a few Torr of pressure by introduction of makeup gas such as Ar, He, N2 and others. The second ion guide 210 is pressurized by leakage from the discharge tube and sustained at a few mTorr. Analytes can be introduced directly from inlet-1 160 directly or by using a GC, which are then ionized within RF confinement field of the ion guide-1 200 and are then introduced into the ion guide-2 210 before directed to the MS 300. Alternatively, ions created in the discharge tube are introduced into the ion guide and analyte are introduced through inlet-2 255. Analyte will be ionized through ion/molecular reaction in ion guide-2 210. Axial field might be provided for the ion guides for exiting ions. The tube 120 is set right inside the ion guide-1 201 and the current that is generated by the plasma is isolated so that it does not influence the ion guides. In this device the ions can be accelerated within the rods. The ions that are not of interest can be removed.

Figure 5:
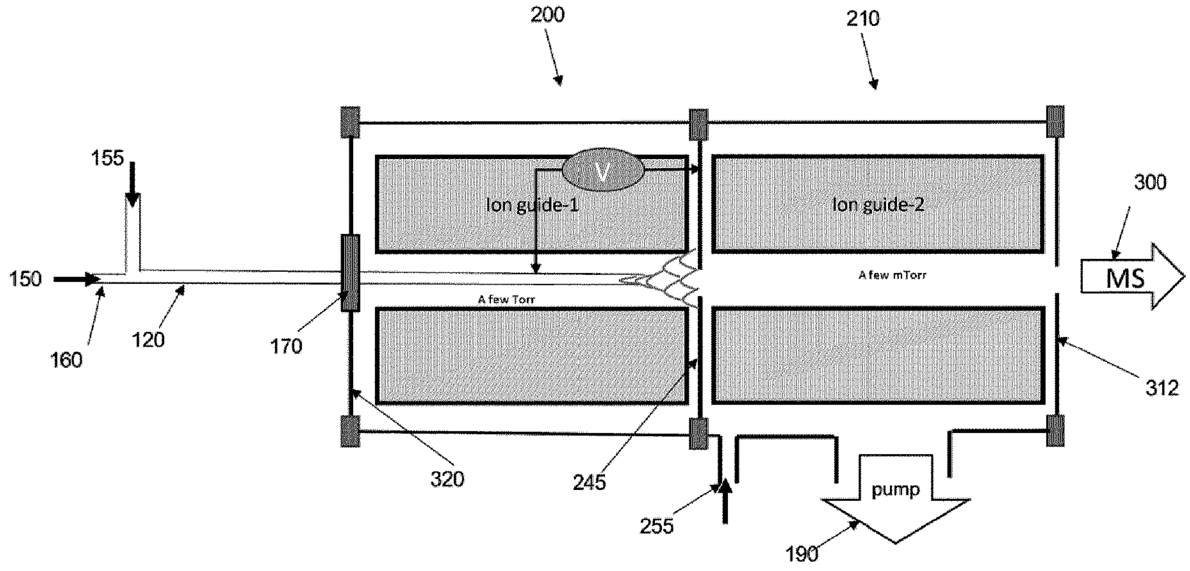
FIG. 5 shows the third embodiment of the present invention in which the discharge tube acting as cathode is inserted directly into the ion guide, and in which the inner lens acts as an anode of the discharge tube.

The third embodiment of the present invention is shown in FIG. 5, in which the cathode 120 is inserted directly into the ion guide 200, and in which the inner lens 245 acts as an anode of the discharge tube 120. Ion guide-1 200 is sustained at a few Torr of pressure by introduction of makeup gas 155 such as Ar, He, N2 and others. Ion guide-2 210 is pressurized by leakage from the discharge tube and is sustained at a few mTorr. Analytes can be introduced from inlet-1 160 directly or by connecting to a GC outlet, and ionized within RF confinement field of ion guide-1 200 and then introduced into the ion guide-2 210 before directed to the MS 300. Alternatively, ions created in the discharge tube are introduced into the ion guide and analytes through inlet-2 255. Analytes will be ionized through ion/molecular reaction in ion guide-2 210. An axial field may be provided to the ion guides for exiting the ions.

Figure 6:
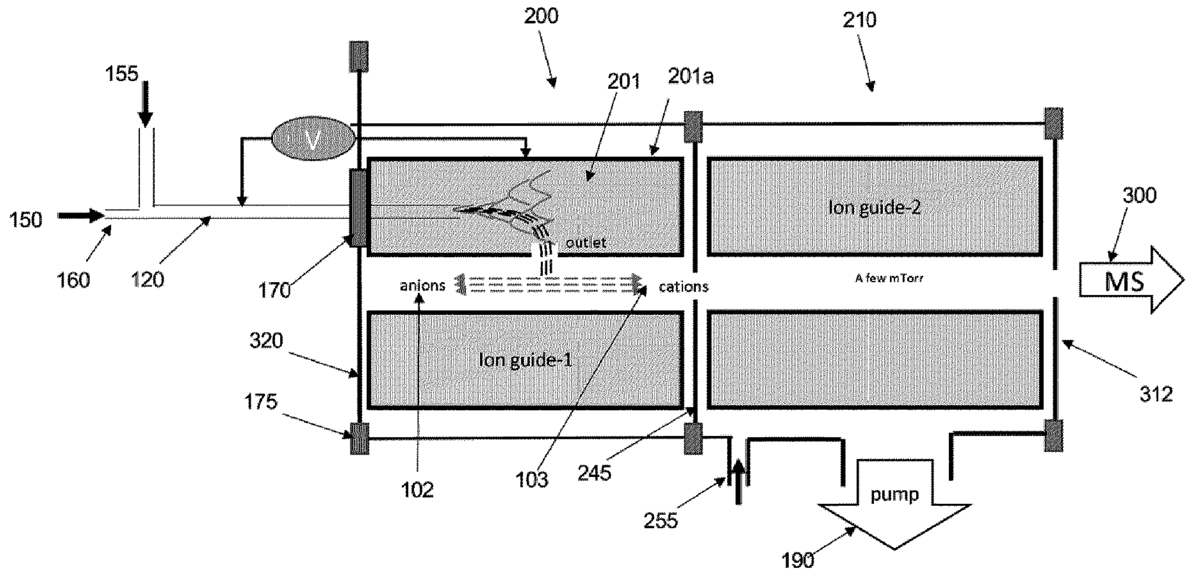
FIG. 6 shows another embodiment of the present invention in which the discharge tube is inserted directly into the rods of the ion guide, and the body of the rods act as a anode of the discharge tube.

The fourth embodiment of the present invention is shown in FIG. 6, in which the cathode tube 120 is inserted directly into a rod 201 of the first ion guide 200, and wherein the body 201*a* of the rod 201 acts as the anode of the discharge tube. There is an opening in the rod to let the ions move out of the rod. The opening size is determined to keep the pressures on both size of the opening at desired conditions. Ion guide-1 200 is sustained at a few Torr of pressure by introduction of a makeup gas, such as Ar, He, N2 and others. Ion guide-2 210 is pressurized by the leakage from the discharge tube and is sustained at few mTorr. Analytes can be introduced from inlet-1 160 directly or by connection to a GC outlet, and ionized within RF confinement field of ion guide-1 200 and then introduce into the ion guide-2 210 before directed to the MS 300. Alternatively, ions created in the discharge tube 120 introduced into the ion guide and analyte via inlet-2 255. Analyte will be ionized through ion/molecular reaction in ion guide-2 210. Rod offset applied to the ion guides determine the polarity of the ions directed into the MS 300. Ions are attracted and repelled by the rod offset. For example if the negative ions are desired, the rod offset is set positive.

The lens 245 located between two ion guides 200, 210 is configured not only to minimize the fringing electric fields at the entrance of the downstream ion guide but also to minimize the fringing fields at the exit end of the upstream ion guide. The lens 245 can be a flat plate entrance lens with an orifice positioned on the centerline which is located as close as possible along the axis to the entrance face of the multipole ion guide rods to minimize fringing effects. The exit lens 312 controls the pressure inside the second ion guide 210.

Analyte ions may be cooled via collisions with gas and focused toward the ion rap axis via an RF quadrupolar field. Alternatively, fragmentation may be induced by electron capture dissociation, electron transfer dissociation, photo-dissociation, metastable activated dissociation, or any other known prior art dissociation method. Ions may be selected via mass selective stability or any known prior art method of quadrupole ion selection.

Figure 7:
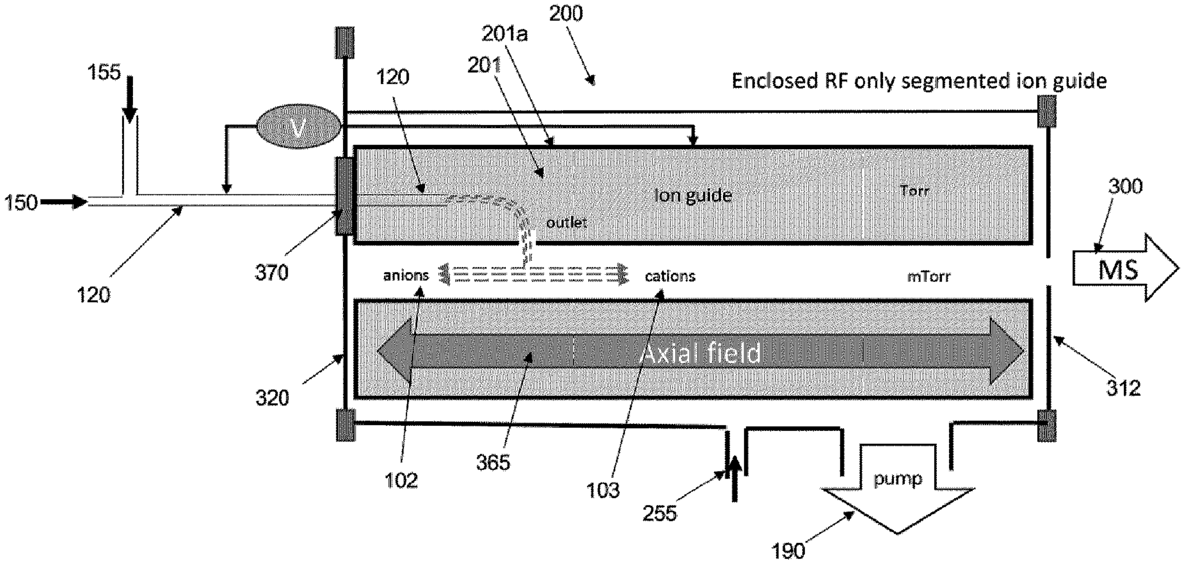
FIG. 7 shows another embodiment of the present invention in which the discharge tube is inserted directly into the hollow rods of the ion guide and is sustained at Torr of pressures.

Another embodiment of the present invention is shown in FIG. 7, in which the cathode 120 is inserted directly into hollow rods 201 of the ion guide 200 sustained at Torr of pressure. Body 201*a* of the rods 201 acts as an anode of the discharge tube. An axial field 365 provided for the ion guide determines the selection of desired polarity of ions transported to the MS 300. A simple change of DC polarity on the axial field allows selection of the desired ions. Here the rod is kept at the torr pressure and between the rods is at mTorr. The lens 312 is predesigned to separate the ions. This way all the ions generated from the source are used for increasing the sensitivity.

Figure 8:
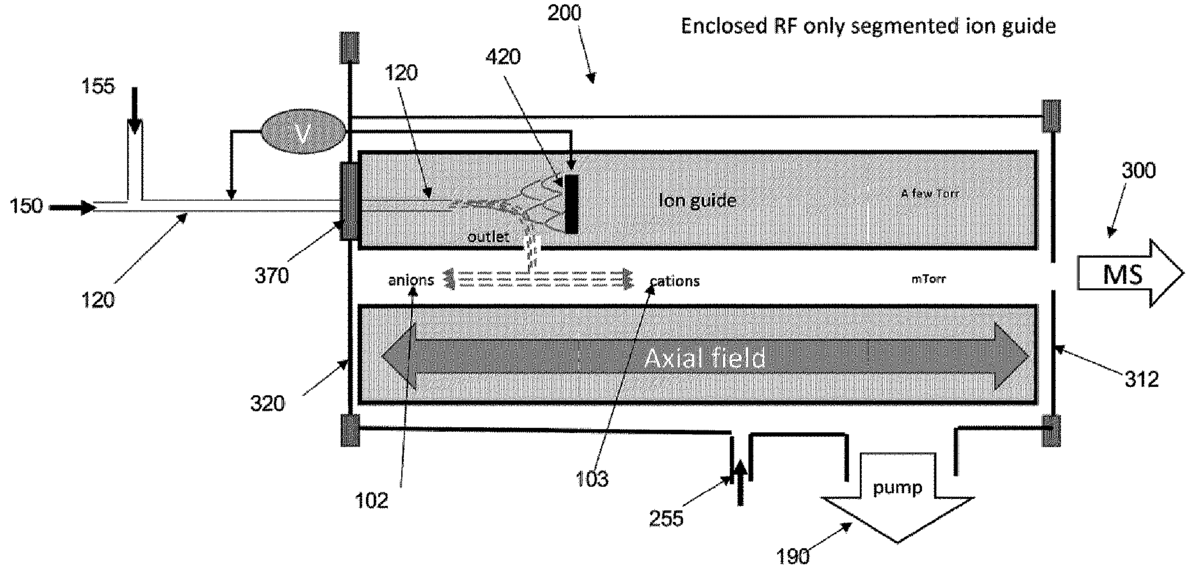
FIG. 8 shows another embodiment of the present invention in which the discharge tube is inserted directly into the hollow rods of the ion guide sustained at Torr pressures, and an extra anode plate is provided to form the ion discharge.
Figure 9:
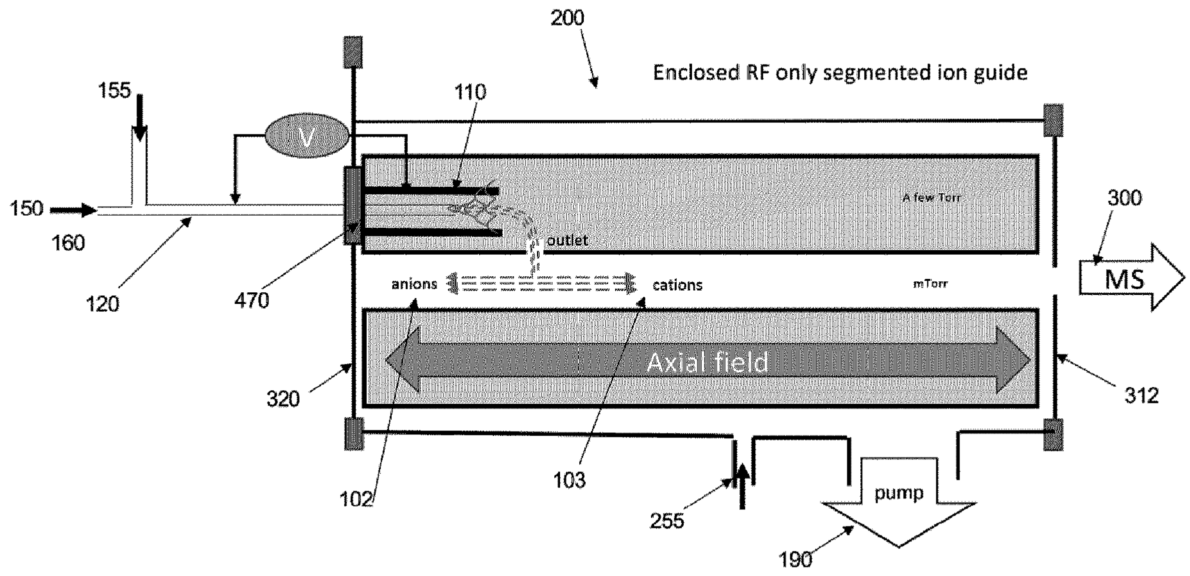
FIG. 9 shows another embodiment of the present invention in which the entire discharged tube is inserted directly into the hollow rods of the ion guide sustained at Torr pressures.

Another embodiment of the present invention is shown in FIG. 8, in which the cathode 120 inserted directly into hollow rod 201 of the ion guide 200 sustained at a few Torr, an extra anode plate 420 is provided. In this case, the body of the rod is not used for the anode, instead a new anode is introduced. This embodiment provides more flexibility in controlling ion flow. There is an opening in the rod to let ions go out of the rod and into the zero field region of the RF field. An axial field Another embodiment of the present invention is shown in FIG. 9, in which the entire discharged tube 100 is inserted directly into hollow rod 201 of the ion guide 200 sustained at a few Torr. In this case, the outer tube 110 of the discharge tube acts as the anode. The opening in the tube wall allows ions to move into the RF field.

Figure 10:
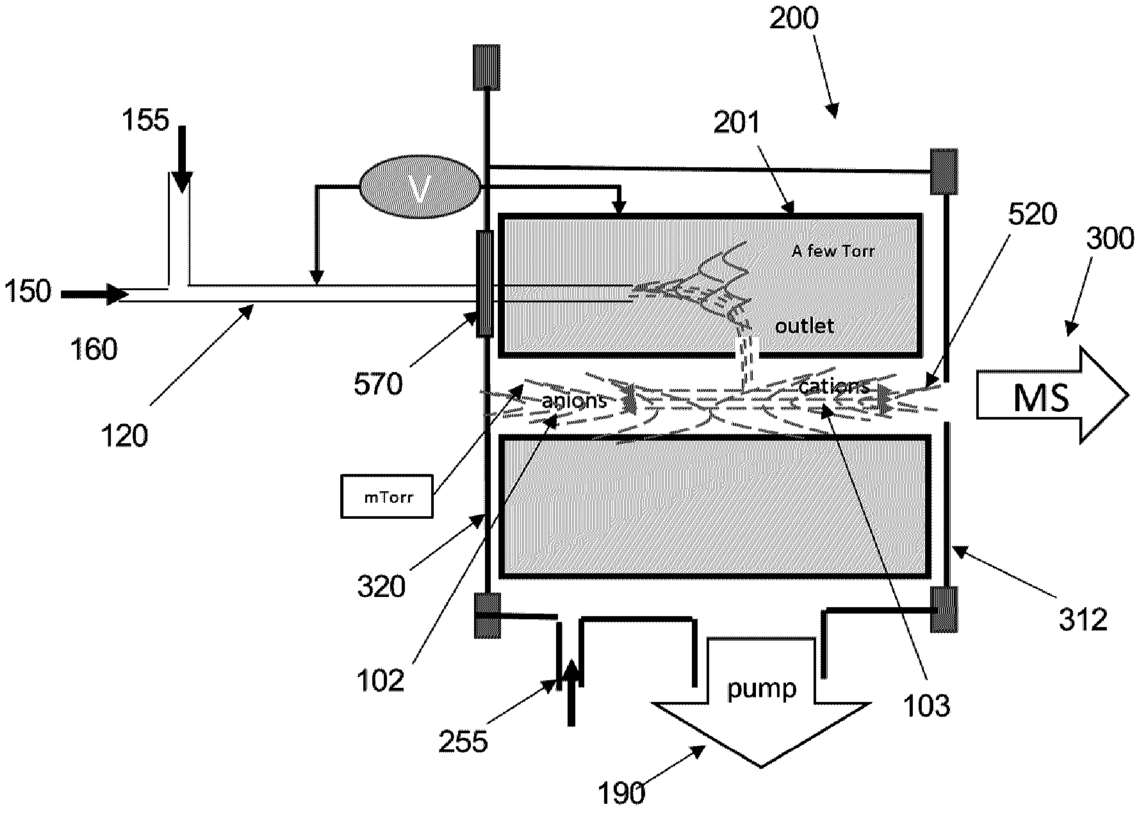
FIG. 10 shows another embodiment of the present invention in which the plasma is formed within the hollow space of the ion guide.

In another embodiment of the present invention is shown in FIG. 10, in which the plasma is formed within hollow space of the ion guide rods by methods describes before. A set of end caps 320 provide necessary axial field for separation of cations and anions. In this case, instead of supplying the axial field, the end caps separate ions and cations. The ion field is so generated to direct the particles. In this embodiment, the end caps do the charge separation.

Figure 11B:
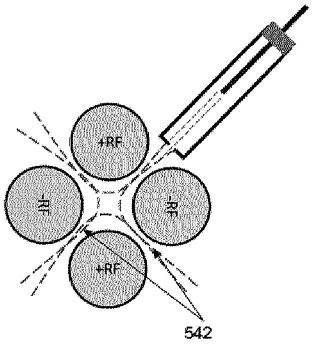
FIG. 11B shows an end cross-sectional view of another embodiment of the present invention in which the ions from the discharge tube are introduced directly into the mTorr region of the ion guide at the zero field.
Figure 11A:
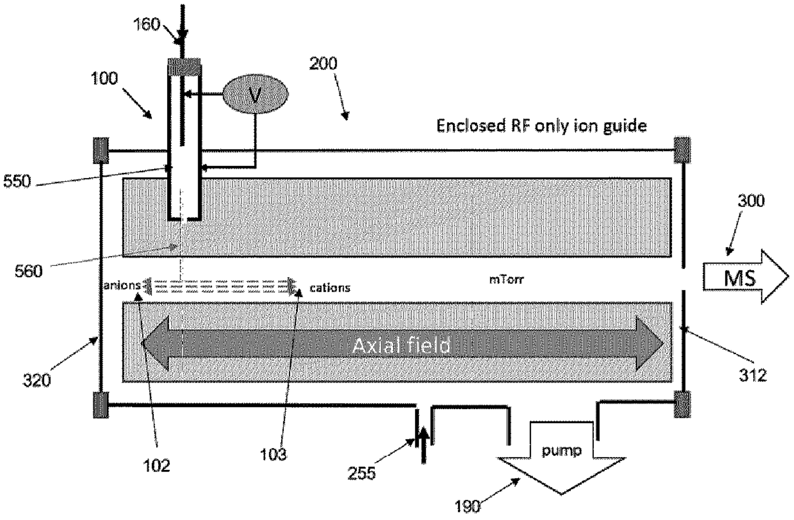
FIG. 11A shows a side cross-sectional view of another embodiment of the present invention in which the ions from the discharge tube are introduced directly into the mTorr region of ion guide at the zero field.

In another embodiment of the present invention is shown in different views in FIGS. 11A and 11B, in which the ions from discharge 100 are directly introduced into the mTorr ion guide at the zero field 542. The end cap 320 can act as separation of ion polarities. Axial field added to assist separation and transportation of the desired ions. In this case, the discharge tube is set at the zero field of the RF.

Figure 12:
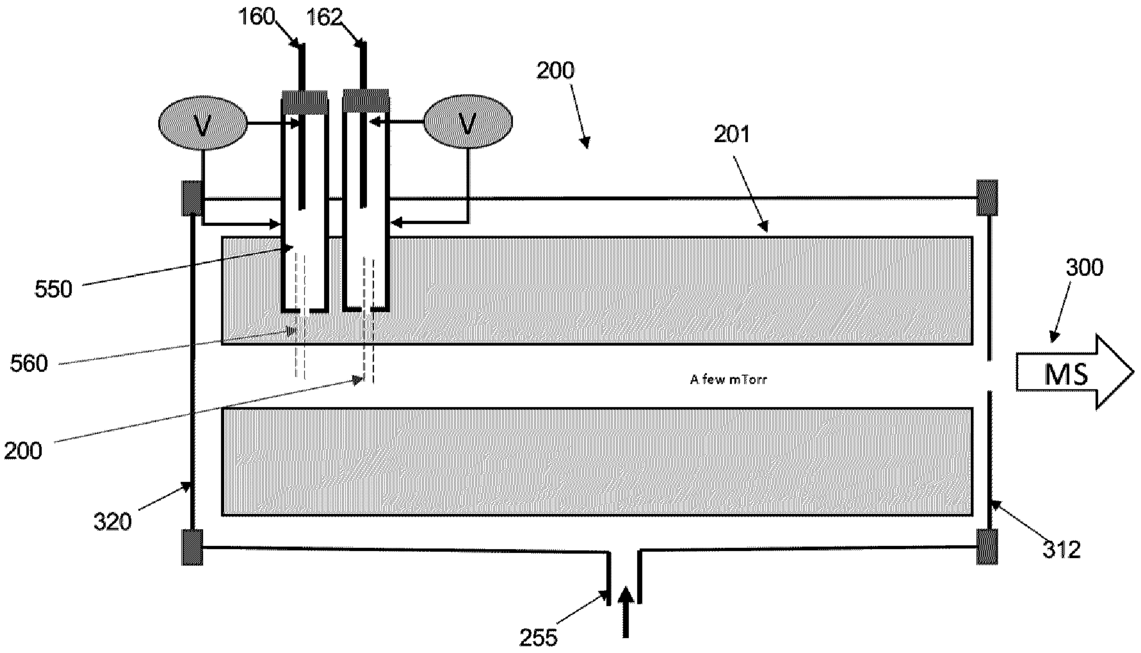
FIG. 12 shows a side cross-sectional view of another embodiment of the present invention in which multiple discharge tube are used to introduce ions directly into the ion guide at the zero field.

In another embodiment of the present invention is shown in FIG. 12, in which the ions from the discharge tube 100 are directly introduced into the ion guide at the zero field with more than one discharge tube. In this case, there can be more than one ion source with inlets at 160, and 162.

Figure 13:
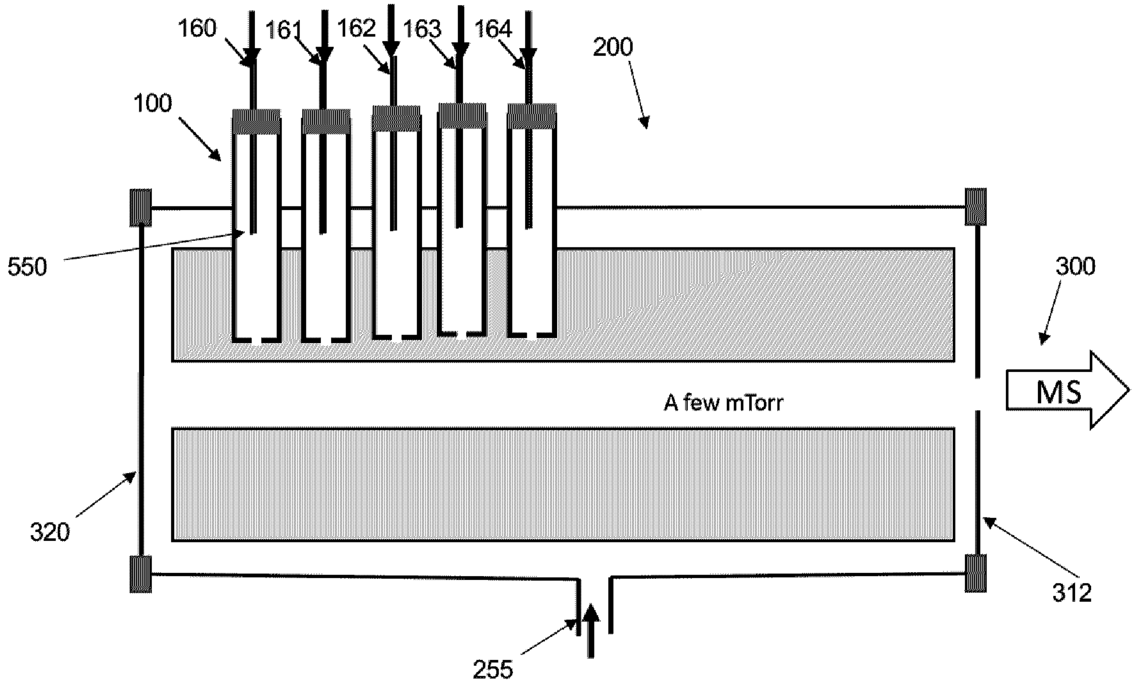
FIG. 13 shows another embodiment of the present invention in which ions from the discharge are directly introduced into the ion guide at the zero field with multiple discharge tube.

In another embodiment of the present invention is shown in FIG. 13, in which ions from discharge tube 100 are directly introduced into the ion guide at the zero field with multiple discharge tubes with inlets 160, 161, 162, 163, 164 and as many is needed can be used.

Figure 14B:
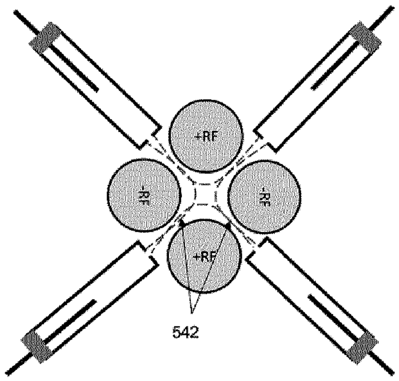
FIG. 14B shows an end cross-sectional view of another embodiment of the present invention in which ions from discharge directly are introduced into the ion guide at the zero field with multiple discharge tube.
Figure 14A:
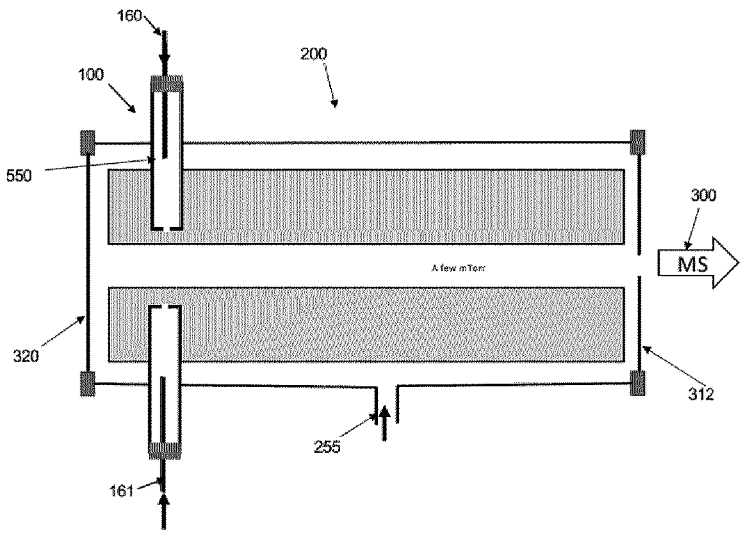
FIG. 14A shows a side cross-sectional view of another embodiment of the present invention in which ions from discharge directly are introduced into the ion guide at the zero field with multiple discharge tube.

In another embodiment of the present invention is shown in different views in FIGS. 14A and 14B, in which ions from discharge directly introduced into the ion guide at the zero field with multiple discharge tube. In this case the tubes are set in opposing cases.

Figure 15:
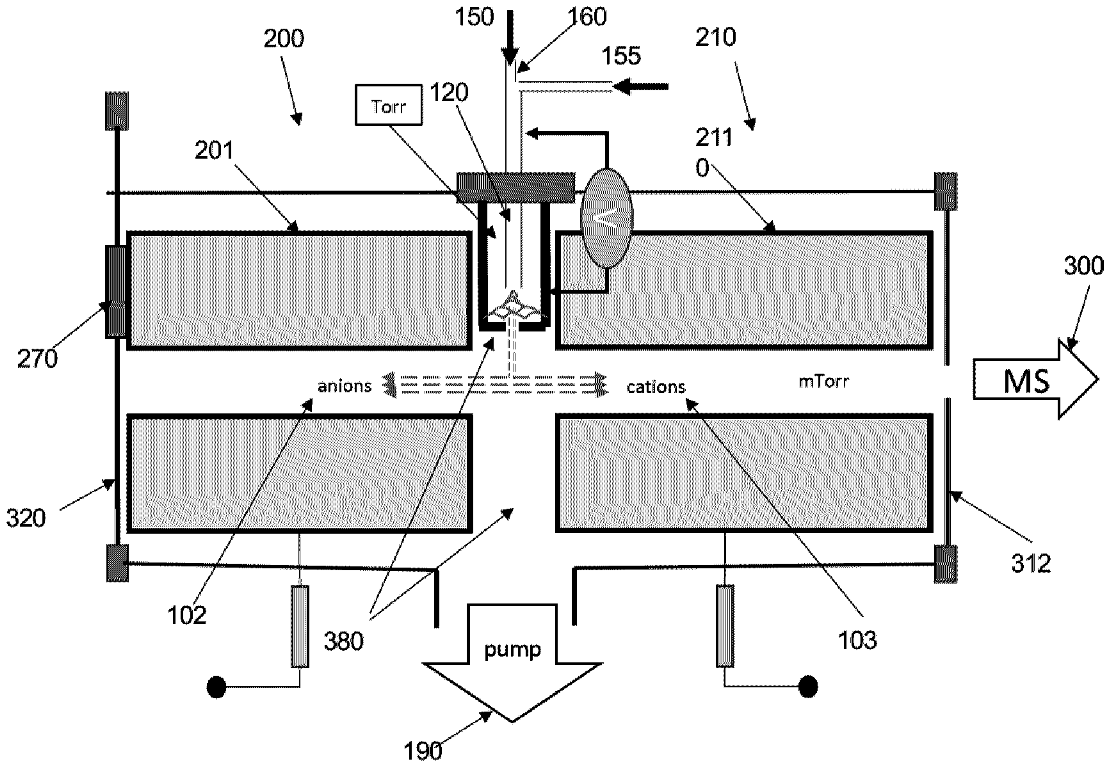
FIG. 15 shows another embodiment of the present invention in which the discharged tube is mounted between the two segments of the ion guide and in the Torr pressure region.

In another embodiment of the present invention is shown in FIG. 15, in which the discharged tube 100 is mounted between the two segments in the Torr pressure region. Ion source is configured to reside entirely in the vacuum pumping stage 380. This generates negative and positive ions within the ion guide. Rod offsets determine the polarity of the ions transporting into the MS 300. By changing the polarity of the MS the cations or anions are selected easily for analysis. The entire system is at low pressure (mTorr). The flow coming from the discharge tube 100 is entirely guided by the inlet flow 150. Then, by applying different pressures, one can decide where each ion can go. One can utilize the positive 102 and negative 103 ions created by the plasma for the flow. This case improves the transmission efficiency of ions into the quadrupole ion trap and allows the recapture of ions ejected from the three-dimensional ion trap.

The invention claimed is:

1. A system for production of high yield of ions for use in a mass spectrometer (MS), comprising:

a) an ion discharge tube comprising a cathode tube and an anode surface, wherein the cathode tube has a first inlet to provide analytes, a second inlet to provide a makeup gas and an outlet, and a high voltage source applied on the ion discharge tube to generate an ion flow;

b) a first ion guide, being a multipole ion guide having a set of rods which are AC or DC voltage electrodes, configured with predefined radial diameters, an exit lens and a set of insulators, and having an entrance aperture and an exit aperture, wherein the entrance aperture is aligned with the outlet of the ion discharge tube, and wherein, an RF field of the first ion guide has a set of zero-field-lines along an x-axis and a y-axis that are central lines of a cross section of the first ion guide, and a z-axis that is along the length of the rods;

c) a third inlet on the first ion guide to inject a reagent into the first ion guide, and whereby meta-stable neutrals are quenched by introducing the reagent through the third inlet;

d) wherein the multipole ion guide is pressurized by the leakage from the outlet of the ion discharge tube to be sustained at a few mTorr by a vacuum pump, wherein analytes and a background gas are introduced at the first and the second inlets of the cathode tube, wherein the ion flow is injected into the set of zero-field-lines, and wherein the analyte is ionized through ion-molecular reaction before introduction into the MS, and since ions are injected in the set of zero-field-lines, the trajectories of ions are substantially parallel and collimated inside the MS.

2. The system of claim 1, wherein the multipole ion guide comprises a quadrupole, a hexapole, or an octupole.

3. The system of claim 1, wherein the cathode tube is placed in a central space between the set of rods of the first ion guide to directly inject ions into a zero-field-line along the z-axis of the first ion guide, and wherein the outer surfaces of the set of rods acts as the anode surface of the ion discharge tube.

4. The system of claim 1, wherein the cathode tube is placed in a central space between the set of rods of the first ion guide to directly inject ions into a zero-field-line along the z-axis of the first ion guide, and wherein an inner lens in between the first ion guide and a second ion guide acts as the anode surface.

5. The system of claim 1, wherein the cathode tube is placed inside of a receiving rod of the set of rods of the first ion guide and the inner surfaces of the receiving rod act as the anode surface, and wherein the receiving rod has an opening to allow the ion flow to leave the receiving rod and into the RF field, and wherein a flow of the background gas is configured to inject the ion flow into the zero-field-lines of the RF field.

6. The system of claim 5, wherein the cathode tube is placed inside of the receiving rod of the first ion guide and the anode surface is a plate placed inside the receiving rod, and wherein the receiving rod has an opening to allow the ion flow to leave the receiving rod and into the RF field, and further having an axial field to control the ion flow in the RF field.

7. The system of claim 5, wherein the cathode tube is placed inside the receiving rod, and the anode surface is an annular tube set around the cathode tube, and wherein the receiving rod has an opening to allow for the ion flow to enter into the zero-filed-lines of the first ion guide, and wherein a set of end caps are configured to control the ion flow in the RF field.

8. The system of claim 7, further having a second cathode tube placed in a second receiving rod, and a second anode surface is a second annular tube set around the second cathode tube, and wherein the second receiving tube has a second opening to allow for the ion flow to enter the ion guide at the zero-field-lines.

9. The system of claim 1, further having a second ion guide that is separated from the ion guide by an inner lens having an inner aperture configured to keep the first ion guide at a higher pressure than the second ion guide, wherein the cathode tube is inserted into the first ion guide, and the anode surface is the inner lens, and wherein the ion flow is set on the zero-field-lines, and the inner lens is configured to control the ion flow from the first ion guide on the second ion guide.

10. The system of claim 9, further having an axial field to control the ion flow from the first ion guide to the second ion guide or to the MS, wherein an entrance voltage is set to push ions towards the exit aperture of the first ion guide.

11. The system of claim 1, having at least one ion discharge tube radially placed in between two neighboring rods of the first ion guide to inject a radial ion flow into the zero-field-lines in the cross section of the first ion guide.

12. The system of claim 11, further having at least one opposing ion discharge tube radially placed in between two neighboring rods of the first ion guide to inject an opposing radial ion flow into the zero-field-lines in the cross section of the first ion guide and in the opposite direction of the radial ion flow generated by the at least one ion discharge tube, whereby the radial ion flow and the opposing radial flow impinge on each other on the zero-filed line on the z-axis of the first ion guide.

13. The system of claim 1, having at least a first ion discharge tube radially placed in between a first rod and a second rod; at least a second ion discharge tube placed in between the second and a third rod; at least a third ion discharge tube placed in between the third and a fourth rod, and at least a fourth ion discharge tube placed in between the fourth and the first rod of the first ion guide being a quadrupole.

14. The system of claim 9, wherein the ion discharge tube is placed in a vacuum pumping stage in between the first and second ion guides, and wherein a rod offset system controls the ion flow within the first and the second ion guides.

* * * * *